United States Patent
Rege

Patent Number: 6,018,546
Date of Patent: *Jan. 25, 2000

[54] TECHNIQUE FOR SOFT DECISION METRIC GENERATION IN A WIRELESS COMMUNICATIONS SYSTEM

[75] Inventor: Kiran M. Rege, Marlboro, N.J.

[73] Assignee: Lucent Technologies Inc., Murray Hill, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/931,532

[22] Filed: Sep. 16, 1997

[51] Int. Cl.[7] .................................................. H04L 27/30
[52] U.S. Cl. ......................... 375/208; 375/206; 375/324; 370/209
[58] Field of Search ...................... 375/200, 205, 375/206, 208, 209, 210, 262, 324, 341, 343; 370/209, 320, 335, 342; 371/43.6, 43.7

[56] References Cited

U.S. PATENT DOCUMENTS

| | | | |
|---|---|---|---|
| 4,894,842 | 1/1990 | Broekhoven et al. | 375/200 |
| 5,361,276 | 11/1994 | Subramanian | 375/200 |
| 5,442,627 | 8/1995 | Viterbi et al. | 370/209 |
| 5,555,268 | 9/1996 | Fattouche et al. | 375/206 |
| 5,602,833 | 2/1997 | Zehavi | 370/209 |
| 5,671,255 | 9/1997 | Wang et al. | 375/341 |
| 5,742,595 | 4/1998 | Bhagalia | 370/342 |
| 5,778,030 | 7/1998 | Bruckert et al. | 375/317 |
| 5,790,515 | 8/1998 | Lipa | 370/209 |
| 5,862,190 | 1/1999 | Schaffner | 375/341 |
| 5,862,453 | 1/1999 | Love et al. | 455/69 |

FOREIGN PATENT DOCUMENTS

| | | |
|---|---|---|
| 0484067 | 5/1992 | European Pat. Off. . |
| 2298766 | 9/1996 | United Kingdom . |

*Primary Examiner*—Wellington Chin
*Assistant Examiner*—Congvan Tran
*Attorney, Agent, or Firm*—Joseph J. Opalach

[57] ABSTRACT

A demodulator of a CDMA base station receiver comprises a bank of 64 noncoherent Walsh correlators, each of which are identified by an index value and provide a correlator output signal to a soft decision metric generator. The soft decision metric generator provides a decision metric, $D_k$, as a function of the L highest energy correlator output signals and their corresponding index values, where L>1.

26 Claims, 2 Drawing Sheets

100

200

6,018,546

TECHNIQUE FOR SOFT DECISION METRIC GENERATION IN A WIRELESS COMMUNICATIONS SYSTEM

FIELD OF THE INVENTION

This invention relates generally to communications and, more particularly, to wireless systems.

BACKGROUND OF THE INVENTION

On the reverse link (uplink) of a CDMA (code division multiple access) wireless system based on the TIA standard IS-95 or ANSI standard STD-J-008, the coding scheme involves, among other things (like convolutional coding), the use of Walsh coding, as known in the art. In this form of Walsh coding, groups of data, each group comprising 6 bits, are mapped into one of 64 Walsh codewords before transmission. In other words, the value of the 6 bits provide an index into one of the 64 Walsh codewords.

In general, the demodulator for this scheme (located in the base-station receiver) employs a RAKE receiver with multiple fingers, as known in the art, where each finger is capable of locking onto and demodulating a received multipath signal. Each such finger comprises a bank of 64 Walsh correlators where each Walsh correlator is tuned to a different one of the 64 possible Walsh code words and is identified by a corresponding 6 bit index value as used in the transmitter. The output signals of the corresponding Walsh correlators in each active finger (i.e., those that are locked on to a multipath) are summed to obtain 64 output signals—one for each Walsh index. For simplicity, the remainder of this description of the prior art and the inventive concept (described further below) is in the context of a single finger RAKE receiver with one bank of Walsh correlators.

As part of the demodulation process, a received signal, after undergoing despreading, is fed to a bank of Walsh correlators for correlation with each Walsh codeword. The output signals of the Walsh correlators are fed to a soft decision metric generator along with the corresponding Walsh indices. The soft decision metric generator provides a decision metric, $D_k$, for each bit of a selected Walsh index ($k=1, 2, \ldots, 6$) for subsequent use by a Viterbi decoder. As such, the soft decision metric generator is a critical component of the base-station receiver and its performance can significantly affect the signal-to-noise ratio (SNR) requirement for the reverse link.

One method for soft decision metric generation is known as the conventional method (e.g., see "Digital Communications," Proakis, J., 2nd Ed., McGraw-Hill, New York, 1989). In particular, let $Z_0, Z_1, \ldots, Z_{63} \ldots$, denote the corresponding energy levels of the 64 correlator output signals passed to the decision metric generator. In the conventional method, the soft decision metric generator makes a hard decision about the transmitted Walsh code by selecting the Walsh index associated with the correlator output signal having the highest energy level. The soft decision metric generator then passes a decision metric to a Viterbi decoder by weighting the corresponding values of the selected index bits as a function of this highest energy level. To see how the conventional method works, let $Z_{max}$ be the energy level of the selected (i.e., highest energy) correlator output signal, and let $\underline{I}_{max} = \{I_{max}(1), I_{max}(2), I_{max}(6)\}$ be the corresponding Walsh index, where the 6-bit vector $\underline{I}_{max}$ is a binary representation of the selected Walsh index. The resulting decision metric for the $k^{th}$ bit ($k=1, 2, \ldots, 6$) covered by this Walsh codeword is give by:

$D_k = +Z_{max}$, if $I_{max}(k)=1$; and $D_k = -7-\text{max}$, if $I_{max}(k)=0$.

Note, that in this algorithm all bits (code symbols) of the selected index are weighted (+/−) by the same energy level, $Z_{max}$. While the conventional method is relatively simple to implement (in terms of the required complexity of ASIC (application-specific integrated circuit) implementation), its performance falls considerably short of the near-optimal method (e.g., see "CDMA—*Principles of Spread Spectrum Communication*," Viterbi, A. J., Addison Wesley, Reading Mass., 1995).

In the near-optimal method, and using the same notation as before, assume that $Z_0, Z_1, \ldots Z_{63}$, are corresponding energy levels of the 64 correlator output signals for a received Walsh codeword. The decision metric for the $k^{th}$ bit ($k=1, 2, \ldots, 6$) is the energy difference between the largest correlator output signal whose index has a 1 in the $k^{th}$ position and the largest correlator output signal whose index has a 0 in the $k^{th}$ position. That is, $$D_k = \underset{\underline{I}:I(k)=1}{\text{Max}} Z_{\underline{I}} - \underset{\underline{I}:I(k)=0}{\text{Max}} Z_{\underline{I}}.$$

The near-optimal method is known to yield considerably superior performance (in terms of the required SNR) at the expense of a significant increase in receiver complexity.

SUMMARY OF THE INVENTION

I have developed a decision metric generation technique whose performance (in terms of SNR requirements) is only slightly below that of the above-mentioned near-optimal algorithm—yet is less complex than the near-optimal technique and only marginally greater in complexity than the conventional technique. In particular, and in accordance with the invention, a soft decision metric generator provides a decision metric, $D_k$, as a function of the L highest energy correlator output signals and their corresponding index values, where L>1.

In an embodiment of the invention, a demodulator of a CDMA base station receiver comprises a bank of 64 non-coherent Walsh correlators, each of which are identified by an index value and provide a correlator output signal to a soft decision metric generator. The soft decision metric generator provides a decision metric, $D_k$, as a function of the 2 highest energy correlator output signals and their corresponding index values.

DETAILED DESCRIPTION

Figure 1:
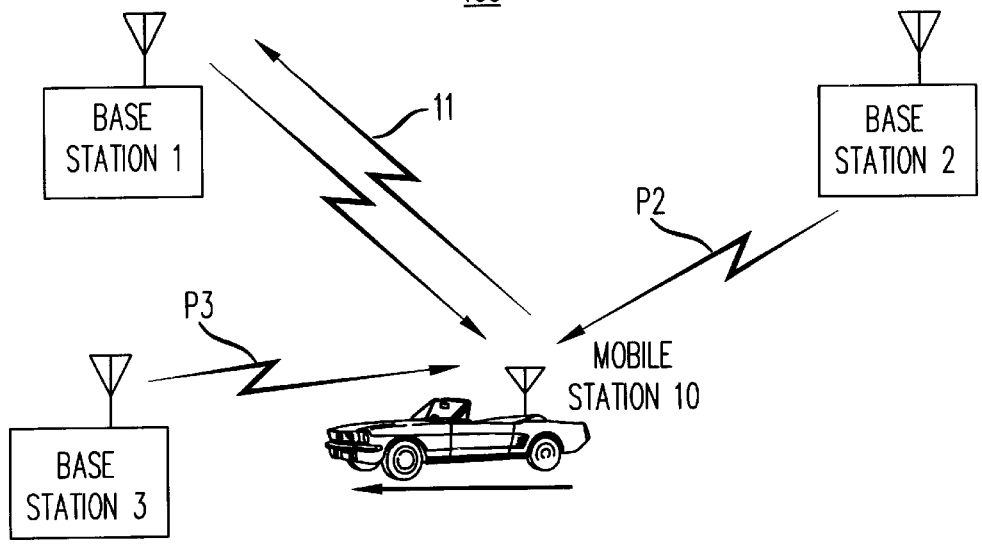
FIG. 1 shows a portion of a mobile communications system embodying the principles of the invention.

A portion of a CDMA mobile communications system 100 embodying the principles of the invention is shown in FIG. 1. Except as noted below, it is assumed that the CDMA mobile communications system conforms to industry standard IS-95. Portion 100 comprises three base stations: 1, 2, and 3; and a mobile station 10, which is illustratively represented by a vehicle icon. The three base stations and the mobile station are representative of wireless endpoints. Other than the inventive concept, the elements shown in FIG. 1 are well-known and will not be described in detail. Although the inventive concept is applicable to any wireless endpoint, this illustrative embodiment is described in the context of mobile station 10 transmitting a reverse channel (uplink) signal 11 to base station 1. Also, as noted earlier, for simplicity the inventive concept is described in the context of one bank of Walsh correlators. However, the inventive concept is applicable to a multi-finger RAKE receiver, where each finger comprises a bank of Walsh correlators.

As known in the art, the uplink signal 11 is formed in a transmitter (not shown) located within mobile station 10 from a Walsh encoder as known in the art. (It should be noted that the uplink signal 11 is also formed from other elements (not shown) of the transmitter such as a convolutional coder). In this form of Walsh coding, groups of data, each group comprising 6 bits (or symbols), are mapped into one of 64 Walsh codewords before transmission. In other words, consider a group of six code symbols, $\underline{c}=[c1, c2, \ldots, c6]$. The mapping uses the six bit codeword, $\underline{c}$, as the index of the Walsh codeword $W(\underline{c})$. For instance, if $\underline{c}=[1.00101]$, the binary value of which represents the number 37, then the 37th Walsh codeword is used for transmission. The resulting sequence of Walsh codewords is further spread (not shown) using a long PN (pseudo-random number) sequence and then quadrature modulated with short PN sequences. Each quadrature spread sequence is transmitted with biphase shift keying (BPSK) modulation (not shown) with ½ chip time offset as known in the art.

Figure 2:
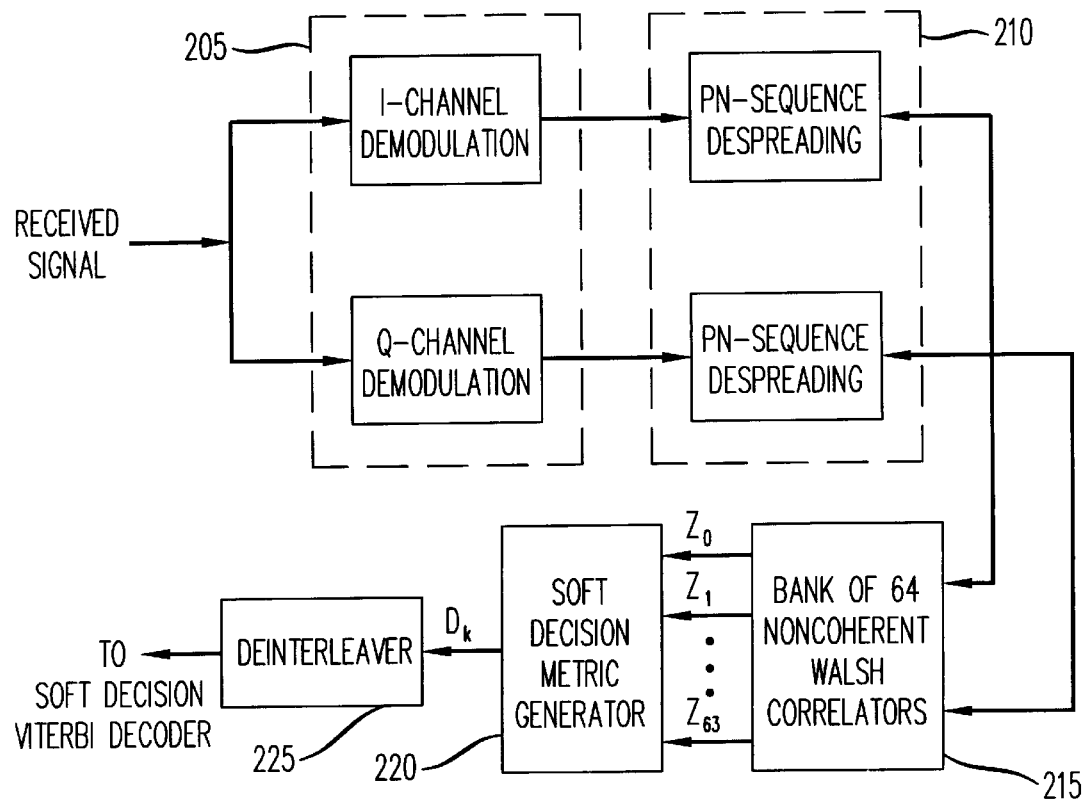
FIG. 2 shows a portion of a receiver embodying the principles of the invention.

In accordance with the principles of the invention, each base station, as represented by base station 1, comprises receiver portion 200, which is shown in FIG. 2. Receiver portion 200 includes demodulation element 205, despreading element 210, a bank of 64 non-coherent Walsh correlators (correlator bank) 215, soft decision metric generator 220, and deinterleaver 225. (Elements 210, and 215 are typically included in the finger(s) of a RAKE receiver). The received signal is provided by a radio-frequency (RF) section (not shown) of the wireless endpoint. This signal is demodulated by demodulation element 205, which comprises both an I-channel (in-phase channel) and a Q-channel (quadrature channel) as known in the art. The resulting demodulated signal is applied to despreading element 210 for despreading the PN-sequences in the I-channel and Q-channel. The output signal from despreading element 210 is applied to correlator bank 215.

As known in the art, correlator bank 215 comprises 64 noncoherent Walsh correlators (per finger of a RAKE receiver). (It should be noted that when viewed at the signal component level there are 128 correlators since for each of the 64 Walsh indices there are two correlators—one for the I-channel signal and one for the Q-channel signal. The output signal of the I-channel and Q-channel correlators associated with a Walsh index are squared and then summed to form the corresponding output signal. Each Walsh correlator is tuned to a different one of the 64 possible Walsh code words and is identified by a corresponding 6 bit index value as used in the transmitter. Correlator bank 215 correlates the output signal provided by despreading element 210 with each Walsh codeword. These output signals of the correlator bank 215 are fed to soft decision metric generator 220. As shown in FIG. 2, these output signals are represented by $Z_0, Z_1, \ldots, Z_{63}$, each of which represents an energy level of the corresponding output signal. The subscript is representative of the corresponding Walsh index. For example, $Z_0$, represents the energy level of the output signal from the Walsh correlator with an associated Walsh index of 0.

Soft decision metric generator 220 is, illustratively, a stored-program controlled processor with memory, e.g., a digital signal processor (DSP) as known in the art. In accordance with the principles of the invention, soft decision metric generator 220 provides a decision metric, $D_k$, for each of the k bits of the Walsh index (k=1, 2, \ldots, 6) as a function of the L highest energy correlator output signals (described further below). In other words, soft decision metric generator 220 assigns higher weights to those bit (code symbol) positions which have a greater likelihood of being correct. The sequence of decision metrics, $D_k$, are applied to deinterleaver 225, which provides a deinterleaved sequence to a Viterbi decoder (not shown) for extraction of the transmitted information as known in the art.

Figure 3:
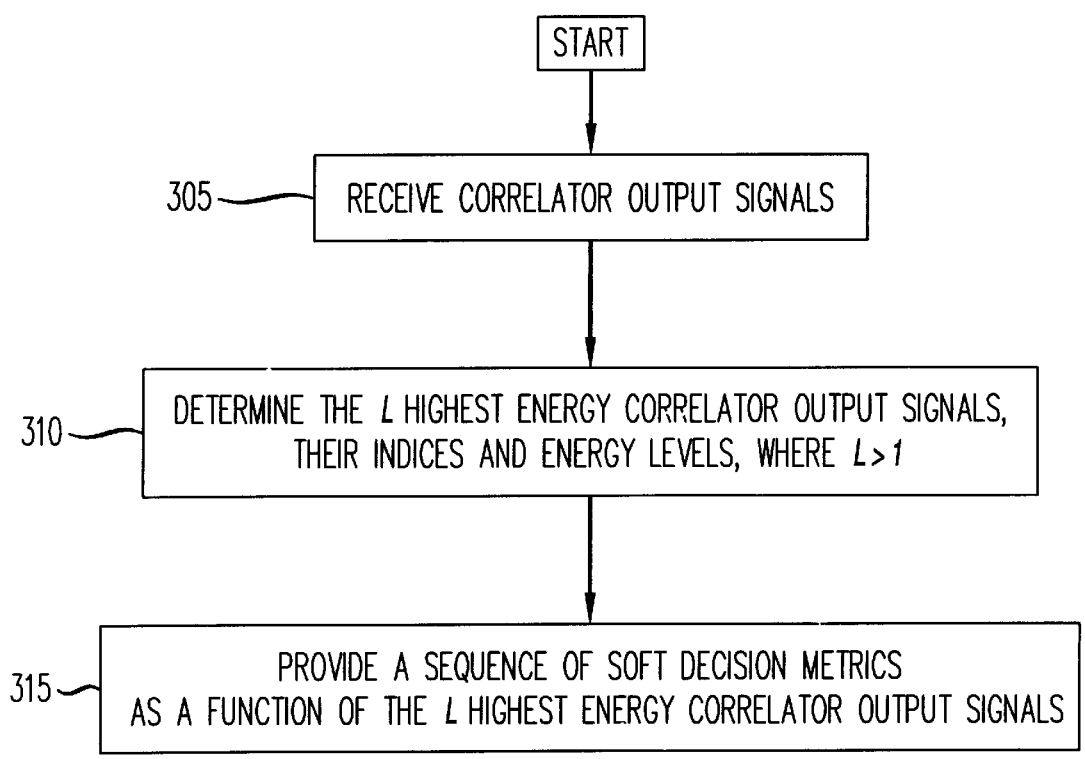
FIG. 3 shows an illustrative flow chart embodying the principles of the invention for use in a wireless endpoint.

An illustrative method embodying the principles of the invention is shown in FIG. 3. In step 305, soft decision metric generator 220 receives the correlator output signals. In step 310, soft decision metric generator 220 determines the L highest energy correlator output signals and records their indices and energy levels. In particular, let $I_{max}^{(1)}, I_{max}^{(2)}, \ldots I_{max}^{(L)}$ represent the Walsh indices of the L highest energy correlator output signals arranged in a descending order of energy levels. Let $Z_{max}^{(1)}, Z_{max}^{(2)}, Z_{max}^{(L)}$ denote the corresponding energy levels. In step 315, soft decision metric generator 220 provides a sequence of soft decision metrics, $D_k$, (k=1, 2, \ldots, 6), as a function of the L highest energy correlator output signals and their corresponding index values, where L>1.

For example, consider, L=2. In this instance, soft decision metric generator 220 identifies the two highest energy correlator outputs $Z_{max}^{(1)}$ and $Z_{max}^{(1)}$. Here, the former is the highest and the latter is the second highest energy correlator output. Let $I_{max}^{(1)}$ and $I_{max}^{(2)}$ be the respective Walsh indices. Let $I_{max}^{(1)}(I_{max}^{(2)}(k))$ denote the $k^{th}$ bit in a binary representation of $\underline{I}_{max}^{(1)}(\underline{I}_{max}^{(2)})$). Then, for k=1, 2, \ldots, 6, soft decision metric generator computes the weights $D_k$ for the $k^{th}$ bit position as follows:

$D_k = +\sigma_k$, if $I_{max}^{(1)}(k)=1$; and
$D_k = -\sigma_k$, if $I_{max}^{(1)}(k)=0$, where:

$\sigma_k = Z_{max}^{(1)}$ if $I_{max}^{(1)}(k) \neq I_{max}^{(2)}(k)$, and
$\sigma_k = 2Z_{max}^{(1)} - Z_{max}^{(2)}$ if $I_{max}^{(1)}(k) = I_{max}^{(2)}(k)$.

For the more general case of L, where L>1, soft decision metric generator 220 omputes the weights $D_k$ for the $k^{th}$ bit position (k=1, 2, \ldots, 6) as follows:

$D_k = +\sigma_k$, if $I_{max}^{(1)}(k)=1$; and
$D_k = -\sigma_k$, if $I_{max}^{(1)}(k)=0$.

The weight $\sigma_k$ is computed according to the following logic given in the form of pseudo code:

```
FLAG = 0;
for (j = 2, j ≤ L, j++)
{
    if I_max^(j)(k) ≠ I_max^(l)(k),
    {
        FLAG = j;
        break;
    }
}
if FLAG ≡ 0
    σ_k = (Z_max^(l) − Z_max^(L)) + (Z_max^(L−l) − Z_max^(L))
else
    σ_k = (Z_max^(l) − Z_max^(FLAG)).
```

Essentially, what the algorithm does is to search the second through the $L^{th}$ highest energy Walsh indices to find one which differs from the highest energy Walsh index $I_{max}^{(1)}$ in the $k^{th}$ bit position. If no such index is found (which happens if all of the L highest energy Walsh indices are identical in the $k^{th}$ bit position), the level of certainty for that bit (approximated by the energy difference as in the near-optimal algorithm) is at least as much as the energy difference between the highest and the $L^{th}$ highest energy outputs. This measure is approximated by the sum of this quantity (i.e., $(Z_{max}^{(1)}-Z_{max}^{(L)})$) and the energy difference between the $L-1^{st}$ highest energy correlator output signal and the $L^{th}$ highest energy correlator output signal. On the other hand, if there is a Walsh index among the L highest energy correlator output signals which differs from the highest energy index in the $k^{th}$ bit position, the measure of certainty for that bit is approximated by the difference between $Z_{max}^{(1)}$ and the energy level of the highest energy Walsh index which differs from $I_{max}^{(1)}$ in the $k^{th}$ bit position.

It is easy to see that for L greater than or equal to 33, one will always find a Walsh index among the L highest energy Walsh indices which will differ from $I_{max}^{(1)}$ in a given bit position. In that case, although the inventive algorithm is different, the weights accorded to the bit position will be identical to those given by the near-optimal algorithm. Consequently, the error performance of the inventive algorithm, too, will be identical to that of the near-optimal algorithm. Of course, the inventive algorithm will be highly complex if one were to use L equal to 33 or larger which will defeat the very purpose for which this algorithm was developed.

Illustrative simulations results are shown below in Table One for a reverse link of IS-95 at Rate Set 1. (As known in the art, IS-95 comprises different rate sets. Rate Set 1 corresponds to the use of a ⅓ convolutional code.) Table One compares the performance of the conventional algorithm, the near-optimal algorithm, and the inventive concept for values L=2 and L=3, under Additive White Gaussian Noise (AWGN) channel conditions at different values of SNR measured in terms of the ratio of the energy per information bit and the single sided noise power spectral density ($E_b/N_o$).

TABLE ONE

| $E_b/N_o$ (in dB) | conventional | near-optimal | L = 2 | L = 3 |
|---|---|---|---|---|
| 4.5 | 46.7% | 21.6% | 32.3% | 23.3% |
| 5.5 | 5.3% | 1.7% | 2.9% | 1.9% |
| 6.5 | 0.34% | 0.12% | 0.17% | 0.13% |

As shown in Table One, the performance of the inventive concept at L=3 is virtually indistinguishable from that of the near-optimal algorithm. Even the simple L=2 implementation affords only a slightly less performance capability. In terms of SNR requirements for comparable error rates in AWGN conditions, the simple L=2 is only about a quarter of a dB worse than the near-optimal algorithm. It is clear, therefore, that error performance comparable to that of the near-optimal algorithm is possible at significantly less complexity through these simple implementations of the proposed decision metric generation algorithm.

As described above, the inventive concept provides a simpler algorithm (with marginally greater complexity than the conventional algorithm) whose performance (in terms of SNR requirements) is only slightly less than that of the near-optimal algorithm. Performance can approach that of the near-optimal algorithm by increasing the value of L at a corresponding cost in complexity.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the inventive concept was illustrated herein as being implemented with discrete functional building blocks, e.g., a soft decision metric generator, the functions of any one or more of those building blocks can be carried out using one or more appropriately programmed processors, e.g., a digital signal processor. It should be noted that the inventive concept is also applicable to other wireless systems (not just CDMA) and other coding schemes (not just Walsh coding).

Also, in the context of a RAKE receiver having multiple fingers, the output signals of the corresponding Walsh correlators in each finger are first summed to obtain 64 output signals—one for each Walsh index, which are then applied to the soft decision metric generator in accordance with the principles of the invention.

Further, instead of simple energy differences, one could use differences between some fixed monotonic functions of output energies in the computation of decision metrics.

What is claimed:

1. A method for use in wireless receiver equipment, the method comprising the steps of:

receiving N signals, each received signal associated with a corresponding Walsh index, each Walsh index comprising k bits; and selecting L of the N received signals such that the remaining L−N received signals have energy levels less than, or equal to, the L selected signals, where 1<L [≦N]<N, and;

providing a soft decision metric for each of the k bits as a function of the L selected signals.

2. The method of claim 1 further comprising the step of correlating a signal with a bank of correlators for providing the N signals.

3. The method of claim 2 wherein the bank of correlators are Walsh correlators.

4. The method of claim 1 further comprising the step of using a RAKE receiver, having at least one finger, for providing the N signals.

5. The method of claim 1 further comprising the step of deinterleaving the provided soft decision metrics for generating a deinterleaved sequence of soft decision metrics for use by a Viterbi decoder.

6. The method of claim 1 wherein L=2.

7. The method of claim 1 wherein L=3.

8. A method for use in a receiver, the method comprising the steps of:

receiving N signals, each received signal associated with a corresponding Walsh index, each Walsh index comprising k bits; and providing a soft decision metric for each of the k bits as a function of the two received signals having the highest energy levels;

wherein a magnitude of the soft decision metric for each of the k bits is equal to (a) the difference in energy levels between the two received signals having the two highest energy levels when the value of that bit in the associated index for the two received signals is different, or (b) twice the difference in energy levels between the two received signals having the two highest energy levels when the value of that bit in the associated index for the two received signals is the same.

9. The method of claim 8 further comprising the step of using a RAKE receiver, having at least one finger, for providing the N signals.

10. The method of claim 8 further comprising the step of deinterleaving the provided soft decision metrics for generating a deinterleaved sequence of soft decision metrics for use by a Viterbi decoder.

11. Apparatus for use in a receiver, the apparatus comprising:

a processing element for receiving N signals, each received signal associated with a corresponding Walsh index, each Walsh index comprising k bits; and wherein the processing element (a) selects L of the N received signals such that the remaining L−N received signals have energy levels less than, or equal to, the L selected signals, where 1<L<N, and (b) provides a soft decision metric for each of the k bits as a function of the L selected signals.

12. The apparatus of claim 11 further comprising a correlator for correlating a signal with a set of predefined signals and for providing the N signals, which represent the correlation.

13. The apparatus of claim 12 wherein the correlator is a Walsh correlator.

14. The apparatus of claim 11 further comprising a RAKE receiver, having at least one finger, for correlating a signal with a set of predefined signals and for providing the N signals, which represent the correlation.

15. The apparatus of claim 11, wherein a magnitude of the soft decision metric for each of the k bits is equal to (a) the difference in energy levels between the two received signals having the two highest energy levels when the value of that bit in the associated index for the two received signals is different, or (b) twice the difference in energy levels between the two received signals having the two highest energy levels when the value of that bit in the associated index for the two received signals is the same.

16. The apparatus of claim 11 further comprising a deinterleaver for generating, from the provided soft decision metrics, a deinterleaved sequence of soft decision metrics for use by a Viterbi decoder.

17. The apparatus of claim 11 wherein the receiver is part of a wireless endpoint.

18. The apparatus of claim 11 wherein the receiver is part of a code division multiple access wireless system.

19. Apparatus for use in a receiver, the apparatus comprising:

a correlating element for correlating a received signal with a set of predefined signals for providing N output signals, each output signal being associated with a corresponding Walsh index, each Walsh index comprising k bits; and a soft decision metric generator for selecting L of the N output signals such that the remaining L—N output signals have energy levels less than, or equal to, the L selected signals, where 1<L<N, and for providing a soft decision metric for each of the k bits as a function of the L selected signals.

20. The apparatus of claim 19 wherein the set of predefined signals are Walsh codes.

21. The apparatus of claim 19 wherein the correlating element is a Walsh correlator.

22. The apparatus of claim 19, wherein the correlating element is at least one RAKE receiver having at least one finger.

23. The apparatus of claim 19, wherein L is equal to 2 and a magnitude of the soft decision metric for each of the k bits is equal to (a) the difference in energy levels between the two output signals having the two highest energy levels when the value of that bit in the associated index for the two output signals is different, or (b) twice the difference in energy levels between the two output signals having the two highest energy levels when the value of that bit in the associated index for the two output signals is the same.

24. The apparatus of claim 19 further comprising a deinterleaver for generating, from the provided soft decision metrics, a deinterleaved sequence of soft decision metrics for use by a Viterbi decoder.

25. The apparatus of claim 19 wherein the receiver is part of a wireless endpoint.

26. The apparatus of claim 19 wherein the receiver is part of a code division multiple access wireless system.

* * * * *